United States Patent [19]

Fox

[11] Patent Number: 4,610,428
[45] Date of Patent: Sep. 9, 1986

[54] HERMETICALLY SEALED ELECTROMAGNETIC SOLENOID VALVE

[75] Inventor: Clarence D. Fox, Decatur, Ill.

[73] Assignee: Borg-Warner Automotive, Inc., Troy, Mich.

[21] Appl. No.: 793,020

[22] Filed: Oct. 30, 1985

Related U.S. Application Data

[63] Continuation of Ser. No. 710,760, Mar. 11, 1985, abandoned.

[51] Int. Cl.$^4$ .................... F16K 31/06; H01F 7/08
[52] U.S. Cl. .................... 251/129.16; 251/129.21; 335/237
[58] Field of Search .................... 251/129.16, 129.21; 335/237

[56] References Cited

U.S. PATENT DOCUMENTS

| 2,442,016 | 5/1948 | Poole | 335/237 X |
|---|---|---|---|
| 2,795,679 | 6/1957 | Lowry, Jr. et al. | 335/237 X |
| 3,410,519 | 11/1968 | Evans | 251/129.16 |
| 3,429,340 | 2/1969 | Opel et al. | 137/625.65 |
| 3,498,330 | 3/1970 | Paige | 137/625.65 |
| 3,545,472 | 12/1970 | Franz | 137/116.5 |
| 3,586,287 | 6/1971 | Knobel | 251/24 |
| 3,688,495 | 9/1972 | Fehler et al. | 60/39.28 |
| 3,861,644 | 1/1975 | Knape . | |
| 4,027,850 | 6/1977 | Allen . | |
| 4,196,751 | 4/1980 | Fischer et al. | 251/129.16 X |
| 4,251,052 | 2/1981 | Hertfelder et al. . | |
| 4,522,371 | 6/1985 | Fox et al. . | |

FOREIGN PATENT DOCUMENTS 0077599 4/1983 European Pat. Off. .

Primary Examiner—Arnold Rosenthal
Attorney, Agent, or Firm—James A. Geppert

[57] ABSTRACT

An electromagnetic valve assembly for fluid flow control is disclosed wherein the fluid flow through the assembly is hermetically sealed. The assembly provides a means to calibrate the power (i.e., voltage or amperage) level where fluid will flow through the valve at a predetermined pressure differential across the armature. The calibration means includes an annular washer with cam-like segments at its outer edge which segments cooperate with slots of a housing to define an air gap, that may be varied over the range defined by the cam-like segment. The assembly, the annular washer, housing, central core and armature cooperate to provide an electromagnetic flux path. The relative magnitude or strength of this flux path provides control of the armature to seal flow through such valve assembly, which magnetic strength is in part a function of the air gap distance at a given power input and fluid pressure.

32 Claims, 8 Drawing Figures

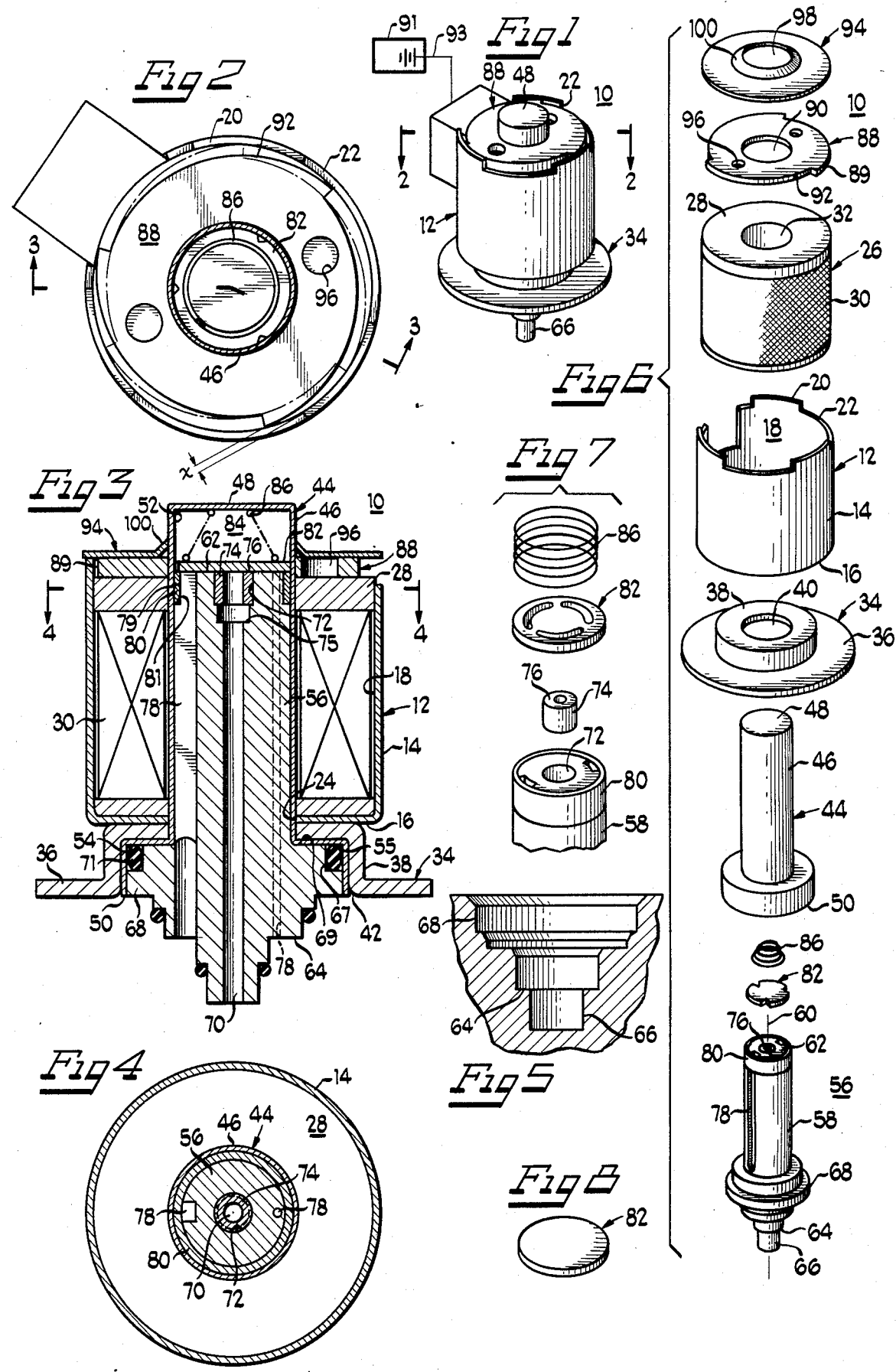

HERMETICALLY SEALED ELECTROMAGNETIC SOLENOID VALVE

This is a continuation, of application Ser. No. 710,760 filed Mar. 11, 1985, now abandoned.

The present invention discloses an electromagnetic solenoid valve assembly for fluid control. Such solenoid valves are known and used to control both hydraulic and pneumatic flow. These valve assemblies may be spring biased, operable in conjunction with connecting rods or ball valves, or they may cooperate with diaphragm operated devices. Solenoid operated valves are responsive to variations in current and/or voltage through the solenoid to control fluid flow as a function of fluid flow rate or pressure. Some of these valves operate in a steady state condition (i.e., a direct current flow at a given voltage) where the forces, such as mechanical spring bias, electromagnetic field, and/or fluid pressure, are balanced or calibrated for valve operation in a given mode. Most of these valve assemblies are not electrically adjustable, however, some solenoid assemblies are adjustable after assembly such as by a screw means.

Adjustment of the solenoid assembly varies the fluid flow and pressure operating against a bias spring to effect a change in the operation of the valve. The bias springs for these various devices may be altered to change the spring force constants. The number of turns or windings of the solenoid coil, the materials of construction, and the sizes of the assemblies are also variable. These adjustable devices become somewhat complex and relatively expensive to assemble.

Solenoid valves find particular application in modern automobiles equipped with microprocessors. The microprocessor receives input data signals indicating physical parameters, such as exhaust gas oxygen content, vehicle speed, engine RPM, engine temperature, or other operating parameters, and thereafter evaluates and/or compares the data to produce a signal which may control fuel input, spark advance or other operating conditions. A microprocessor in an automobile circuit is capable of producing an output signal that will actuate a solenoid valve at a given current amplitude to provide a predictable or desired output from a variable fluid source, such as manifold vacuum. The microprocessor, in the case of an automobile, can control the duty cycle or on-time of a square wave signal to maintain the fluid pressure or vacuum output at a desired level for a given amperage signal. This control can be achieved even though the engine compartment and solenoid temperatures vary. The level of the amperage signal can also be derived from simpler arrangements, such as a signal generator or a simple power supply, when closed loop control is not required.

A solenoid-operated valve is illustrated in U.S. Pat. No. 3,429,340-Opel et al., which discloses a manual override means for a solenoid operator, but does not teach a hermetically sealed valve with an external means to adjust the air gaps, and thus the control point, after assembly.

U.S. Pat. No. 3,498,330-Paige illustrates a screw plug for adjusting the air gap distance, referred to as the axial length therein, between the disc valve and the valve seat. It is noted that the air-gap distance affects the response time and that the valve is intended as an on-off type switch when an electromagnet is energized.

U.S. Pat. No. 3,586,287-Knobel teaches a fast-acting two-way valve having a spring-biased flapper valve. This is an on-off solenoid operator with concentric tubes for fluid pressure communication. There is no provision for adjusting the air gap distance to control the response of the armature after assembly.

U.S. Pat. No. 3,545,472-Franz discloses a device with a diaphragm-actuated armature. The armature is spring-biased in the normally-open position. The armature seals vacuum communication when the pressure differential acting on the diaphragm and the magnetic force on the sole plate are sufficient to close the armature against the spring bias.

U.S. Pat. No. 3,688,495-Fehler et al teaches alternative embodiments of a solenoid-operated fuel metering device for a gas turbine engine. The nozzle end is screwed to a body in FIGS. 2 and 4, however, the nozzle carries and secures a bushing for a metering needle. The needle is operable by an armature which, in FIGS. 3 and 4, can have its stroke increased or decreased by means of positive stops. Control of fuel flow is provided by pulse time modulation and the armature disc must be flexible to restore itself to its reference or open position. An alternative embodiment notes that a diaphragm may be affixed to the disc to provide pneumatic as opposed to electrical operation. Following assembly of the solenoid, there is no method to adjust or vary the air-gap distance.

U.S. Pat. No. 3,861,644-Knape discloses an on-off solenoid which modulates the force acting on the armature. There is no teaching of an adjusting means to vary the air gap.

U.S. Pat. No. 4,027,850-Allen teaches a spring biased armature in a solenoid valve. The spring is secured in a bore by an end plug with a screw thread, but there is no provision to adjust the air gap after assembly.

U.S. Pat. No. 4,251,052-Hertfelder et al. teaches an electromechanical valve with a non-magnetic housing; a magnet spool; a magnetic core member with a through-bore and an armature seat; a magnetic armature with a mating surface for the armature seat, which armature has axial grooves; and a rod connected to and operable with the armature, which rod has a valve member affixed to its end. The valve member controls fluid flow past a valve seat. The air-gap distance between the armature and valve is fixed at assembly and decreases as the valve member wears. Fluid flow is provided through a sieve disc, the core member through-bore and about the axial grooves of armature 21 when the valve seat is sealed. Armature 21 and thus valve member 17 is normally biased open by spring 23.

European Patent Application No. 0,077,599-Fox teaches a solenoid operator with a flat disc armature in FIG. 1, which utilizes a non-magnetic seat for the armature with a central core which is moved to vary the air-gap distance. The spring maintains the disc in proximity to the seat. This valve structure is not hermitically sealed and does not have a cam operator to vary the air gap.

The present invention is directed to a solenoid valve assembly which is electromagnetically adjustable, operable in response to a varying input electrical signal, and is hermetically sealed for protection of the solenoid coil and to insure uncontaminated fluid flow.

SUMMARY OF THE INVENTION

The present invention is useful in an electromagnetic solenoid valve assembly having a central bore terminating in a non-magnetic seat within an interior central chamber. There is a flat disc armature or closure member operable in this chamber to contact the non-magnetic seat to seal flow between the central bore and an exit port or bore. This device is operable to maintain a specific pressure differential between the central bore and the exit port. The magnetically induced force required to operate the magnetic closure member is affected by the mass of the magnetic closure member and the diameter of the non-magnetic seat. The magnetic closure member may be perforated, serrated or otherwise marked to reduce its mass and allow fluid flow therethrough for communication between the central bore and the exit port. This invention is operable in conjunction with known valve means, and the solenoid is adaptable to control either a vacuum operable or pressure operable device.

BRIEF DESCRIPTION OF THE DRAWING

In the figures of the drawing, like reference numerals identify like components, wherein:

FIG. 1 is a perspective view of the valve assembly of this invention showing the power supply connection;

FIG. 2 is a top elevational view of the proportional solenoid valve of this invention, taken on a line 2—2 of FIG. 1;

FIG. 3 is a generally vertical cross-sectional view of the assembly taken along the irregular line 3—3 of FIG. 2;

FIG. 4 is a horizontal cross sectional view taken along the line 4—4 of FIG. 3;

FIG. 5 is an enlarged partial cross sectional view of the protuberance of the central core;

FIG. 6 is an exploded perspective view of the electromagnetic assembly;

FIG. 7 is an exploded perspective view of the armature and seat arrangement, and includes an alternative embodiment of the armature;

FIG. 8 is a perspective view of an alternative embodiment of the armature.

DETAILED DESCRIPTION OF THE PREFERRED EMBODIMENT

An electromagnetic valve assembly 10 constructed in accordance with the invention is shown in a preferred embodiment in FIG. 1 in a vertical orientation. Valve assembly 10, as seen in FIG. 6, includes a housing 12 a magnetic central core 56, a tube 44, a flange 34, a means for establishing an electromagnetic flux 26, an annular washer 88 and a retaining washer 94. This solenoid operated valve assembly 10 provides control of vacuum or pressure flow to a vacuum or pressure operable device (not shown). A vacuum, in the sense used herein, is a pressure below atmospheric pressure.

The electromagnetic or electromechanical assembly 10 is shown in an exploded view in FIG. 6 and in a cross section along its longitudinal axis in FIG. 3. In FIGS. 3 and 6, housing 12 is a magnetic material and has a sidewall 14 with an upper edge 20 and a bottom wall or flange 16 defining an opening or bore 24 (FIG. 3) which sidewall 14 and bottom wall 16 cooperate to provide a cup-shaped enclosure 18. Sidewall 14 and upper edge 20 cooperate to define at least one slot or notch 22 about edge 20. Electromagnetic flux means 26 includes a bobbin 28 and an electrical winding 30, which bobbin 28 and winding 30 cooperate to define a passage 32 therethrough.

Annular flange 34 has a lower portion 36 and an offset upper portion 38 generally concentrically positioned on lower portion 36. Flange 34 may be of a singular or integral piece with upper portion 38 formed thereon. Portion 38 defines a central aperture 40 therethrough and a first recess 42 in upper portion 38. Annular flange 34 is provided in a preferred embodiment but is not a requisite element for a solenoid operator as the flange may be integral with tube 44 or housing 12. Tube 44 in FIGS. 3 and 6 is a blind-hole, non-magnetic tube or member 44 and has a tube wall 46 with an upper, sealed end 48 and a lower, open end 50. Tube 44 defines a blind-hole passage 52 (FIG. 3) and a second recess 54 with a surface 55 at open end 50. Annular flange 34 may be magnetic or nonmagnetic material.

Magnetic central core 56, a generally cylindrical center segment, includes an outer wall 58 having a longitudinal axis 60, an upper surface 62, and a lower surface 64 with a protuberance 66 extending beyond and smaller in diameter than lower surface 64.

A collar 68 is positioned about the perimeter of lower surface 64 and has a greater diameter than lower surface 64. Central core 56 defines a longitudinal through bore 70 (FIG. 3) extending through the upper surface 62, lower surface 64 and the protuberance 66 to provide communication through central core 56.

In this embodiment, the central core 56 at its upper surface 62 defines an undercut or reamed region 72 (FIG. 7) about bore 70 to receive a non-magnetic insert 74, as also illustrated in FIGS. 3 and 6. In FIG. 3, through-bore or central fluid passage 70 is illustrated with a second undercut 75, but only as a preferred condition not as a requisite to the invention. Non-magnetic insert or seat member 74, which may be brass, provides a non-magnetic seat 76 at upper or first surface 62, and defines a central opening. Central core 56 further defines at least one longitudinal passage or slot 78 at or near the surface of wall 58. Passage 78 provides communication between upper surface 62 and lower surface 64 at a radial distance from bore 70. Slot 78 is illustrated in FIGS. 3 and 6 as a surface slot cut in outer or side wall 58 and communicating past collar 68 into lower surface 64 as a bore. Alternatively, passage 78 may be a through bore or passage near the surface of wall 58 communicating between upper surface 62 and lower surface 64, as illustrated in FIG. 3.

A non-magnetic collar 80, which may be brass or other non-magnetic material, is illustrated in FIG. 6 encompassing magnetic core 56 at upper surface 62. Central core 56 terminates at upper surface 62 in a reduced diameter section 79 with a shoulder 81 between sidewall 58 and reduced diameter section 79 to receive collar 80. Collar 80, non-magnetic seat 76 and upper surface 62 are coplanar. Collar 80 is not a requisite to the present invention but may be utilized to provide a better sealing surface for an armature 82, especially at high pressures or rapid response rates.

Armature 82 in FIG. 3 is positioned in a reference position atop central core 56 to contact upper surface 62 and seat 76. Armature or magnetic closure armature member 82 is illustrated in FIG. 6 as a generally flat disc with scalloped or serrated edges, in FIG. 7 with arcuate slots and in FIG. 8 as an imperforate disc element; however, all three or any variation thereof are operable to seal communication past through-bore 70 by contacting seat 76. These three armature arrangements are alternate embodiments and are representative of potential configurations, although not precluding other configurations.

In FIG. 3 magnetic core 56 is positioned in tube 46, with collar 68 of core 56 having a two step arrangement defining first and second shoulders 67 and 69 therebetween. Second shoulder 69 rests against the surface 55 of second recess or cavity 54. Upper surface 62, sidewall or tube wall 46 and sealed end 48 of tube 44 cooperate to define an operating chamber 84. Positioned in chamber 84 is a bias spring 86 maintaining or biasing armature 82 to contact upper surface 62 and non-magnetic seat member 76 of central core 58.

The electromagnetic winding 30 and bobbin 28 are positioned in the cup-shaped enclosure 18 of housing or outer segment 12, and tube 44 with magnetic core 56 therein is received through aperture 40 of flange 34, bore 24 of housing 12 and passage 32 of flux means 26. Lower end 50 of tube 44 contacts and is retained against smaller diameter 38 of flange 34, and closed upper end 48 extends through passage 32 and projects beyond upper edge 20 of housing 12.

Positioned atop bobbin 28 is an annular washer 88. Washer or top segment 88 is depicted as a thin metallic slice having magnetic characteristics and defining an outer edge 89, an opening 90 generally centrally located in such washer 88, and at least one cam segment 92 at its outer edge 89. Cam segment 92 cooperates with slot 22 of housing 12 to define an air gap noted as 'x' in FIG. 2 that varies along the cam segment 92 as washer 88 is rotated about longitudinal axis 60 and projecting tube 44. Ports or holes 96 may be formed in the annular washer 88 to facilitate ease of rotation and location as well as providing a passage for a sealant or securing means after calibration. Retaining washer 94 is illustrated as an annular element in FIG. 6 with a central passage 98 and a spring-like, sloped collar 100 defined about passage 98. Washer 94 is positioned above annulus 88 with tube 44 extending through passage 98; collar 100 contacting and gripping tube wall 46 to retain and secure washer 94 against annular washer 88 after calibration. However, any securing means such as welding, brazing or an adhesive could also be utilized.

Valve 10 operates to control fluid flow, which fluid is provided either through bore 70 or passages 78 to communicate with operating chamber 84. The valve 10 is hermetically sealed as fluid flow is maintained within tube 44 through bore 70 and passages 78. A seal means 71, such as an O-ring on shoulder 69, or weldment (not shown) may be provided, if needed, between shoulder 69 and surface 55 to prevent leakage. Armature 82, as shown in FIG. 3, is biased by spring 86 to normally contact and close bore 70, and thereby seal communication between the bore 70 and passage 78. Fluid flow at a pressure to overcome spring 86 through bore 70 would act to move armature 82 off seat 72 against the force of spring 86. Current provided to electromagnetic flux means 26 from an energy source 91 through conduit 93 (FIG. 1) induces an electromagnetic field which acts in concert with the bias spring to maintain armature 82 in contact with seat 76 at upper surface 62. As fluid flows past armature 82 between bore 70 and passage 78 there is a pressure drop that is also controlled by valve 10.

Valve 10 includes an adjustable air gap, which is defined as a break in the flux path of such solenoid valves (c.f., 'x' of FIG. 2). In valve 10, the air gap is defined between cam-like segment 92 of washer 88 and slot 22 of housing 12. After assembly of the valve 10, washer 88 is positioned atop bobbin 28 to complete the flux path or circuit and is thereafter rotated about projecting tube 44 to adjust the air gap. The varying air gap between cam-like segment 92 of washer 88 and slot 22 provides a means to externally adjust the solenoid valve response to electrical power, as a function of either current and/or voltage inputs to winding 30, such that armature 82 will be operable to seal or allow flow at a given pressure at a power input. About a given calibration point or pressure, it is further possible to adjust the operating point by changing the current or voltage applied to winding 30. The adjustable air gap also provides a means to overcome variances in part specifications incurred during manufacture of these parts.

While only specific embodiments of the invention have been described and shown, it is apparent that various alterations and modifications can be made therein. It is, therefore, the intention in the appended claims to cover all such modifications and alterations as may fall within the scope and spirit of the invention.

I claim:

1. A hermetically sealed electromagnetic valve assembly comprising:

a magnetic central core with an outer wall, a longitudinal axis, an upper surface, a lower surface, and a protuberance extending beyond and smaller in diameter than said lower surface, said magnetic central core defining a longitudinal through-bore extending through said protuberance, said lower surface and said upper surface; a non-magnetic insert positioned in said through-bore at said upper surface to define a non-magnetic seat at said upper surface and through-bore, said central core further defining at least one longitudinal passage in relative proximity to said outer wall communicating from said upper surface to said lower surface;

said non-magnetic seat and upper surface being coplanar;

an armature positioned and movable atop said upper surface to seal flow through said through-bore and longitudinal passage;

a blind-hole, non magnetic tube having a tube wall and defining a blind-hole passage with a sealed end and an open end;

said core positioned in said tube, said core upper surface and tube wall cooperating to define an operating chamber;

a bias spring positioned in said operating chamber between said armature and tube sealed end to bias said armature to contact and seal said through-bore and longitudinal passage;

a magnetic housing having a sidewall with an upper edge and a bottom wall with a bore therethrough, which bottom wall and sidewall cooperate to define a cup-shaped enclosure, said sidewall further defining at least one slot at its upper edge;

means for establishing the flow of electromagnetic flux through a flux path, which means includes an electrical winding and a bobbin cooperating to define a passage therethrough, said winding and bobbin positioned in said housing enclosure;

said tube projecting through said housing bottom wall bore and said electrical winding passage to protrude beyond said bobbin and winding;

said assembly further comprising an annular washer with an opening and an outer edge defining at least one cam-like segment;

said annular washer positioned on and movable about said protruding tube with said cam-like segment cooperating with said housing upper edge slot to define a variable air gap therebetween.

2. A hermetically sealed electromagnetic valve assembly as claimed in claim 1, wherein said magnetic core lower surface includes a collar positioned about the perimeter of said lower surface.

3. A hermetically sealed electromagnetic valve assembly as claimed in claim 2, wherein said collar is integral with said magnetic central core.

4. A hermetically sealed electromagnetic valve assembly as claimed in claim 1, wherein said insert is brass.

5. A hermetically sealed electromagnetic valve assembly as claimed in claim 1, wherein said magnetic core at its upper surface perimeter defines a wall with a diameter smaller than its outer wall diameter with a shoulder between said smaller diameter and outer wall diameter, a non-magnetic collar closely encompassing said smaller diameter, which non-magnetic collar is coplanar with said upper surface and non-magnetic insert seat.

6. A hermetically sealed electromagnetic valve assembly as claimed in claim 5, wherein said non-magnetic collar is brass.

7. A hermetically sealed electromagnetic valve assembly as claimed in claim 1, wherein said armature is a flat disc.

8. A hermetically sealed electromagnetic valve assembly as claimed in claim 7, wherein said flat disc armature defines slots therethrough.

9. A hermetically sealed electromagnetic valve assembly as claimed in claim 7, wherein said flat disc armature defines a scalloped edge.

10. A hermetically sealed electromagnetic valve assembly as claimed in claim 1, wherein said annular washer with at least one cam-like segment defines at least one hole therethrough to provide a means to rotate said washer about said tube.

11. A hermetically sealed electromagnetic valve assembly as claimed in claim 1, further comprising a retaining washer which defines a central passage and a spring like, sloped collar about said central passage, said retaining washer receiving said protruding tube through said central passage to contact and retain said annular washer in position with said sloped collar.

12. A hermetically sealed electromagnetic valve assembly as claimed in claim 1, wherein said annular washer is secured in position by adhesive means.

13. A hermetically sealed electromagnetic valve assembly as claimed in claim 1, wherein said annular washer is secured in position by a weldment.

14. A hermetically sealed electromagnetic valve assembly as claimed in claim 1, further comprising an annular flange positioned about said tube at said housing bottom wall.

15. A hermetically sealed electromagnetic valve assembly as claimed in claim 14, wherein said annular flange is a separate annular flange defining an aperture to receive said tube and central core.

16. A hermetically sealed electromagnetic valve assembly as claimed in claim 14, wherein said annular flange is integral with said tube.

17. A hermetically sealed electromagnetic valve assembly as claimed in claim 14, wherein said annular flange is integral with said housing.

18. A hermetically sealed valve assembly as claimed in claim 14, wherein said annular flange is of a magnetic material.

19. A hermetically sealed valve assembly as claimed in claim 14, wherein said annular flange is of a nonmagnetic material.

20. A hermetically sealed electromagnetic valve assembly as claimed in claim 1, wherein said armature is operable between a reference position sealing flow through said through bore and said longitudinal passage, and a variable open position to control fluid flow and pressure differential between said through bore and longitudinal passage.

21. An electromechanical valve assembly comprising:
an electrical winding;
a magnetic flux circuit comprising a plurality of adjacent magnetic segments, including a generally cylindrical center segment defining at least one longitudinal passage and a central fluid passage, and having a first surface, an outer segment, and a top segment, at least one of said segments being movable to adjust the extent of an air gap adjacent the movable segment;
a non-magnetic seat member, having a central opening aligned with, and disposed near, one end of said central fluid passage;
a magnetic closure armature member, positioned adjacent the non-magnetic seat member; and
a non-magnetic member defining a blind-hole passage to receive said armature and said cylindrical center segment, said armature with said magnetic segments completing a flux path, such that fluid flow urged by a predetermined pressure difference through the central fluid passage and seat member central opening can be modulated by varying the energization level of the electrical winding, movement of the adjustable segment being effective to vary the air gap distance and thus vary the reluctance of the flux path, to correspondingly adjust the response of the valve assembly for a given energization level of the electrical winding and given pressure difference.

22. An electromechanical valve assembly as claimed in claim 21, wherein said cylindrical central segment further defines a second surface which second surface includes a non-magnetic collar positioned about the perimeter of said second surface.

23. An electromechanical valve assembly as claimed in claim 21, wherein said non-magnetic seat member is brass.

24. An electromechanical valve assembly as claimed in claim 22 wherein said non-magnetic collar is provided about said cylindrical central segment perimeter at said first surface which non-magnetic collar is coplanar with said first surface.

25. An electromechanical valve assembly as claimed in claim 24, wherein said non-magnetic collar is brass.

26. An electromechanical valve assembly as claimed in claim 21 wherein said armature is a flat disc armature.

27. An electromechanical valve assembly as claimed in claim 26, wherein said flat disc armature defines slots therethrough.

28. An electromechanical valve assembly as claimed in claim 26, wherein said flat disc armature defines a scalloped edge.

29. An electromechanical valve assembly as claimed in claim 21 and further comprising a blind-hole, nonmagnetic tube with a sealed end, an open end and a passage to receive said cylindrical center segment.

30. An electromechanical valve assembly as claimed in claim 29 wherein said non-magnetic tube and said first surface cooperate to define an operating chamber; said armature positioned in said operating chamber; a bias spring positioned in said operating chamber between said armature and said tube sealed end to bias said armature to contact and seal said central fluid passage.

31. An electromechanical valve assembly as claimed in claim 30 including a magnetic housing defining an enclosure having a sidewall, an upper edge and a bottom wall with a bore therethrough, said sidewall defining at least one slot at its upper edge which slot and top segment cooperate to define a variable air gap therebetween.

32. An electromechanical valve assembly as claimed in claim 21, wherein said armature is operable between a reference position sealing flow through said central fluid passage and said longitudinal passage, and a variable open position to control fluid flow and pressure differential between said central fluid passage and said longitudinal passage.

* * * * *

UNITED STATES PATENT OFFICE
CERTIFICATE OF CORRECTION

Patent No. 4,610,428　　　　　Dated September 9, 1986

Inventor(s) CLARENCE DENNIS FOX

It is certified that error appears in the above-identified patent and that said Letters Patent are hereby corrected as shown below:

First page of patent - 2nd column - change the name of "Attorney, Agent, or Firm" to - Florian S. Gregorczyk -.

Signed and Sealed this

Ninth Day of December, 1986

*Attest:*

DONALD J. QUIGG

*Attesting Officer*　　　*Commissioner of Patents and Trademarks*